Feb. 25, 1969     W. SIEPMANN     3,429,027
VALVE AND METHOD FOR PRODUCING THE SAME
Filed Nov. 2, 1965
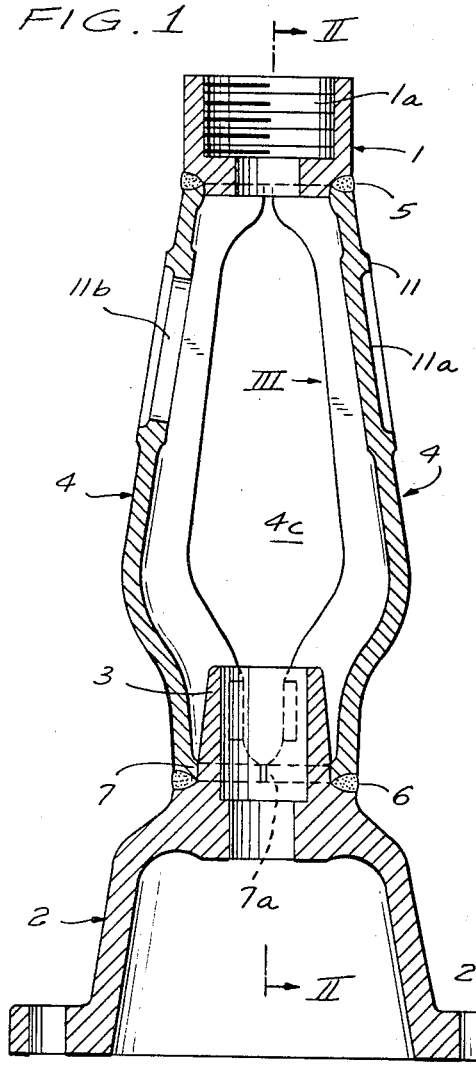
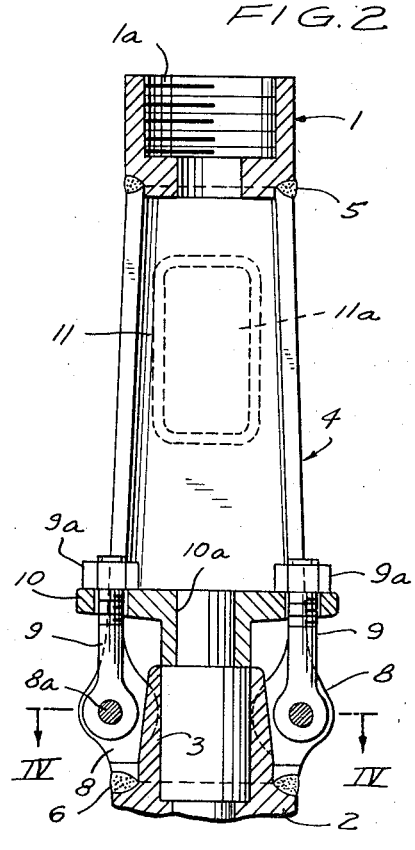
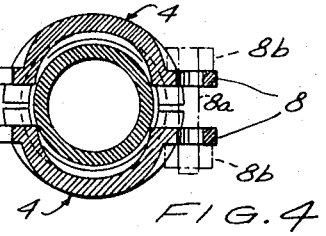
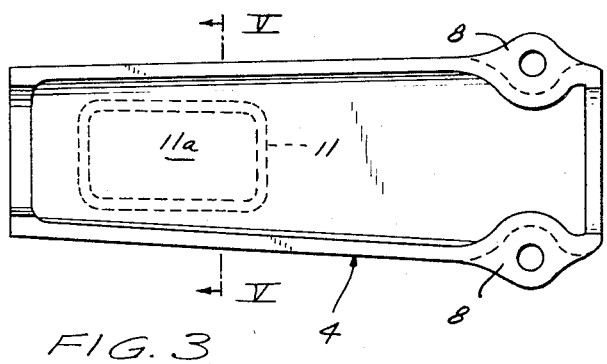
INVENTOR:
WALTER SIEPMANN
BY
Michael J. Striker
his ATTORNEY

United States Patent Office 3,429,027
Patented Feb. 25, 1969

3,429,027
VALVE AND METHOD FOR PRODUCING THE SAME
Walter Siepmann, Belecke (Mohne), Germany, assignor to Stahl-Armaturen Persta G.m.b.H., K.G., Belecke (Mohne), Germany
Filed Nov. 2, 1965, Ser. No. 513,143
Claims priority, application Germany, Nov. 9, 1964,
ST 22,919
U.S. Cl. 29—463                4 Claims
Int. Cl. B23k 31/02; B23p 15/00; F16k 27/08

ABSTRACT OF THE DISCLOSURE

In a valve and in a method of producing the same, a bonnet including an open-ended packing box nipple. A pair of substantially trough-shaped arms have first end portions which are secured to the bonnet surrounding the nipple, and second end portions which are spaced from the nipple. The second end portions carry an annular head. A pair of mounting projections in form of outwardly extending eyes are integral with each of the first end portions so as to be located outwardly adjacent to the nipple. A packing gland comprises a packing gland portion which registers with the open end of the nipple. A fastening arrangement is mounted on the projections and is operative for urging the gland portion into the nipple.

---

The present invention relates to valves in general, and more particularly to an attachment which may be secured to the body of a valve. Still more particularly, the invention relates to an attachment which may be used with advantage in large-size gate valves or the like. The invention also relates to a method of producing and assembling the attachment.

In accordance with presently prevailing practice, attachments for relatively small gate valves or the like (with a nominal diameter of up to 100) are produced as one-piece forgings. Such attachments comprise a head which can accommodate a spindle nut for the rising or nonrising spindle or stem of the valve, a bonnet or cover which may be bolted to the body of the valve, and distancing arms which connect the bonnet with the head. Attachments for large-size valves are normally produced in two parts and such separately produced parts are then welded together. The so-called packing box nipple (i.e., the housing for the packing box) is formed with eyes which carry fasteners serving to urge the gland into compressive engagement with the packing box.

It is also known to utilize a head in the form of a slotted sleeve and to connect such slotted sleeve with the nipple by means of flat or profiled bars or by sheet metal strips which constitute the arms of the attachment and maintain the sleeve at a desired distance from the nipple. A serious drawback of such attachments is that they are too weak for use in many types of large-size valves and that the application of fasteners for the gland requires much time and complicated machinery and thus involves considerable expenses. It was found that separately machined bearings for the fasteners which are welded or otherwise attached to the bonnet or to the body of the valve are likely to hinder rotation of the spindle. Also, proper positioning of parts which are to be welded together to form a conventional attachment involves complicated machinery and considerable skill because even small deviations from accurate alignment will prevent or hinder rotation of the valve spindle.

Accordingly, it is an important object of the present invention to provide a novel attachment for use in gate valves or the like and to construct and assemble the attachment in such a way that its parts can withstand considerable stresses, that the attachment may be used in conduits or pipe lines which convey cold or hot fluids, that the attachment can guide a valve spindle without leakage and with great accuracy, and that the attachment may be mass produced by resorting to readily available machinery.

Another object of the invention is to provide an attachment of the just outlined characteristics wherein all of the welding or analogous bonding operations may be carried out in a single step.

A further object of the invention is to provide an attachment for use in valves with a rising or nonrising spindle and to construct the attachment in such a way that any condensate or other flowable material which happens to enter or accumulates in the interior of the attachment is automatically compelled to escape by gravity flow.

An additional object of the invention is to provide an attachment which can be cooled in a very simple manner and wherein the bearings for the fasteners which bias the packing box gland may form integral parts of the main components of the attachment so that such bearings are formed in automatic response to proper shaping of the respective components.

Still another object of the invention is to provide a novel method of producing and assembling the improved attachment.

A concomitant object of the invention is to provide a method according to which the component parts of the attachment may be produced with a minimum of waste and may be thereupon assembled in a single operation or in a small number of consecutive steps.

Briefly stated, one feature of my present invention resides in the provision of a method of producing an attachment for a valve, particularly an attachment which is adapted to be affixed to the body of a large-size gate valve and wherein a cover or bonnet comprises an open-ended packing box nipple and is connected with the first end portions of two substantially trough-shaped elongated arms the second end portions of which carry an annular head capable of accommodating a spindle nut. The method comprises the steps of separately forming the head, the bonnet and the arms by a forging process, coaxially mounting the head and the bonnet in a welding machine so that the two parts are located at a predetermined distance from each other, placing the two arms diametrically opposite each other (with reference to the common axis of the head and bonnet) so that the first end portions of the arms straddle the nipple of the bonnet and that the second end portions of the arms form an annulus which is adjacent to and coaxial with the head, and welding the bonnet and the head to the respective end portions of the arms.

The bonnet and the head are preferably welded in a simultaneous operation. Also, the forging step preferably includes chamfering the end portions of the arms, the bonnet and the head to provide a pair of annular channels which are disposed at the ends of the arms, and the welding step then preferably comprises forming a pair of annular welded seams each of which fills at least a portion of the respective channel to thereby bond the arms to the bonnet and to the head. The arms are preferably produced by die forging and can be provided with substantially eye-shaped projections which are outwardly adjacent to the nipple and are located substantially diametrically opposite each other. Such projections serve to support rockable fastener means which urge a suitable gland in a direction toward the bonnet so that a cylindrical extension of the gland tends to penetrate into the open end of the nipple. The end portions of the arms are preferably of semicircular shape.

The novel features which are considered as characteristic of the invention are set forth in particular in the appended claims. The improved attachment itself, however, both as to its construction and the mode of producing and assembling the same, together with additional features and advantages thereof, will be best understood upon perusal of the following detailed description of certain specific embodiments with reference to the accompanying drawings, in which:

FIG. 1 is a longitudinal axial section through an attachment whose component parts are produced and assembled in accordance with my invention;

FIG. 2 is a fragmentary vertical section substantially as seen in the direction of arrows from the line II—II of FIG. 1;

FIG. 3 illustrates the inner side of an arm substantially as seen in the direction of the arrow III in FIG. 1;

FIG. 4 is a horizontal section as seen in the direction of arrows from the line IV—IV of FIG. 2; and FIG. 5 is a section as seen in the direction of arrows from the line V—V of FIG. 3.

Referring first to FIGS. 1 and 2, there is shown an attachment which may be bolted to the body of a valve, for example, to the body of a pressure-seal bonnet gate valve with rising spindle or stem. The attachment comprises four main component parts including a one-piece forged annular head 1 which is formed with internal threads 1a to take a spindle nut (not shown), a pair of substantially trough-shaped elongated arms 4 which are preferably formed by die forging, and a cupped cover or bonnet 2 having an integral open-ended packing box nipple 3 which is coaxial with and spaced from the head 1. The bonnet 2 and its nipple 3 form a one-piece forging. An outwardly extending annular flange 2a at the lower end of the bonnet 2 may be bolted or otherwise secured to the body of the valve in a manner not forming part of the present invention. The nipple 3 resembles a smooth-surfaced hollow cylinder whose external surface tapers upwardly, i.e., in a direction toward the head 1. The purpose of this nipple is to accommodate a suitable packing box (not shown) which is compressible by the cylindrical extension 10a of a gland 10 to maintain the packing box in sealing contact with the peripheral surface of a spindle or stem, not shown. The extension 10a registers with the open upper end of the nipple 3.

The arms 4 are disposed diametrically opposite each other (with reference to the common axis of the parts 1 and 3), i.e., they can be said to be mirror symmetrical with reference to the plane of FIG. 2. The upper and lower end portions of the arms 4 are of substantially semicircular shape so that they form a pair of annuli the lower of which straddles the lower end of the nipple 3, namely, that end which is distant and is located opposite the open end into which the extension 10a of the gland 10 extends.

The arms 4 are preferably produced by forging in a two-piece mold including a lower die which is provided with a cavity having an outline corresponding to the external surface of an arm 4 and an upper die having a centrally located projecting portion whose outline corresponds to the outline of the internal surface of the arm. A billet or blank which is placed into the cavity of the lower die is deformed in response to penetration of the projecting portion of the upper die. Such method of producing the arms is very economical because it allows for the production of thin-walled arms with a minimum of waste. The material of the billet first fills the remainder of the cavity and only the rest of such material forms a flashing which penetrates into the gap between the matching surfaces of the two dies. The dies may be shaped in such a way that the arm is provided with one or more reinforcing ribs, rings, beads or otherwise configurated stiffeners.

The end portions of the arms 4 and the adjoining portions of the head 1 and bonnet 2 are chamfered so that such chamfers form a pair of annular channels which are filled, at least in part, by welded seams 5 and 6 forming permanent bonds to thereby nonseparably secure the arms in the positions shown in FIG. 1 or 2. In assembling the attachment, the head 1 and the bonnet 2 are mounted in a suitable welding machine so that the head is coaxial with but remains spaced from the open end of the nipple 3. In the next step, the arms 4 are placed diametrically opposite each other and the machine then forms the seams 5 and 6, preferably in a simultaneous operation.

The lower end portions of the arm 4 are provided with internal beads 7 which slope downwardly toward a pair of vertical gaps 7A. Any condensate or other flowable matter which accumulates in the space surrounding the nipple 3 in thus compelled to flow along the beads 7 and to escape through the gaps 7a.

The lower end portions of the arms 4 are further provided with pairs of outwardly extending eye-shaped bearings or projections 8 which serve to carry a pair of fasteners including threaded bolts or screws 9 and nuts 9a. The bolts 9 are free to swivel about bolts 8a which extend through the aligned eyes 8 of the arms 4, and the axes of the bolts 8a are normal to the axis of the nipple 3, see particularly FIG. 4. The bolts 9 extend through suitable bores in the flange of the gland 10 and, when the nuts 9a are rotated in a sense to move the gland toward the bonnet 2, the extension 10a is caused to penetrate into the nipple 3 to compress the packing box. It will be noted that the eyes 8 are outwardly adjacent to the nipple 3. The bolts 8a and their nuts 8b may also serve to clamp the lower end portions of the arms 4 around the nipple 3 during the formation of welded seam 6.

The outer side of at least one of the arms 4 is preferably provided with at least one flat portion 11a which is surrounded by a frame-like stiffening rib 11. The portion 11a may support a suitable shield carrying the name of the manufacturer, the trademark or trademarks of the manufacturer or distributor, information relating to the type and/or size of the valve, or other indicia. The other arm 4 may be provided with a suitable cutout or window 11b which can be located opposite the portion 11a and serves to allow for circulation of air or another coolant. This is particularly important when the valve is used to regulate the flow of a hot fluid and/or when the valve is installed in a space which is maintained at an elevated temperature.

While the improved attachment may be used in many types of valves, it has been found to be particularly useful in large-size valves, for example, those with a nominal diameter of 150 or more.

A very important advantage of my attachment is that the nipple 3 may be formed as a simple cylinder which is integral with the bonnet or cover 2, and that the bearings or projections 8 need not be formed on or attached to the nipple. As mentioned hereinbefore, many conventional attachments for large-size valves comprise packing box nipples which are produced in a separate operation and are thereupon welded to the bonnet or cover of the valve. Also, many such conventional attachments comprise projections (corresponding to the projections 8 of my improved attachment) which are forged or machined in separate operations and are thereupon welded to the remainder of the attachment. Repeated welding of separately produced parts can result in misalignments and prevents ready rotation of the spindle. In my improved attachment, the projections 8 are formed as integral parts of the arms and are positioned in such a way that each thereof may be formed in a relatively simple mold, i.e., in a mold whose dies may be formed with cavities and/or projecting portions in a simple lathe.

Another important advantage of the improved attachment is that the two arms 4 may be of lightweight construction but still offer satisfactory resistance to deforming and other stresses. The configuration of the arms 4 is preferably such that the spindle (which extends through the spindle nut in the head 1 and through the nipple 3) may be readily cooled by air which passes through the window or windows 11b as well as through large openings 4c between the arms. Such large windows and/or openings also afford convenient access to the packing box. The annular seams 5 and 6 may be formed by resorting to simple welding machines. Since the seams 5 and 6 are preferably formed in a simultaneous operation, the likelihood that the parts 1, 2 and 4 would become misaligned is reduced to a minimum. It was found that two relatively lightweight arms which are configured in a manner as illustrated in the drawings are capable of fully resisting all such deforming stresses which arise when the nuts 9a are driven home to force the extension 10a into strong compressive engagement with the packing box in the nipple 3. Due to the fact that the projections or bearings 8 for the screws 9 are formed as integral parts of the arms 4, the cost of producing and assembling the improved attachment is reduced considerably, especially since the projections 8 may resemble simple eyes or lugs which can be shaped in relatively simple molds.

The cost involved in forming the two welded seams 5 and 6 may be reduced still further if the welding machine is provided with a twin head which can form two seams at a time. Instead of restorting to bolts 8a and nuts 8b as a means for holding the arms 4 in proper position during the formation of the seam 6, the lower end portions of the arms 4 may be spot welded to the bonnet 2 in a first step, and the seam 6 is then formed in a next-following step.

A further very important advantage of the improved attachment is that the internal surface of the nipple 3 is smooth from end to end, i.e., that this internal surface need not be formed with welded seams or spots. This is due to the fact that the nipple 3 is formed as an integral part of the bonnet 2 whereby the attachment need not be subjected to costly and time-consuming precision-finishing treatment, such as is necessary in connection with many types of conventional attachments wherein the nipple is welded to the bonnet and/or to the arms and wherein the internal surface of the nipple must be precision finished subsequent to welding.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A method of producing an attachment for a valve, particularly an attachment which may be secured to a large size gate valve and wherein a bonnet comprises an open-ended packing box nipple and is connected with the first end portions of two substantially trough-shaped arms the second end portions of which carry an annular head, said method comprising the steps of separately forming said head, said bonnet and said arms by a forging process; coaxially mounting said head and said bonnet at a predetermined distance from each other; placing said arms diametrically opposite each other so that the first end portions of the arms straddle the nipple and that the second end portions of the arms form an annulus which is adjacent to said head; and welding said bonnet and said head to the respective end portions of said arms.

2. A method as set forth in claim 1, wherein said bonnet and said head are welded to the arms in a simultaneous operation.

3. A method as set forth in claim 1, further comprising the step of chamfering said end portions, said bonnet and said head to provide a pair of annular channels disposed at the ends of said arms, said welding step comprising forming a pair of annular welded seams each of which fills at least a portion of one of said channels.

4. A method as set forth in claim 1, wherein said arms are produced by die forging.

References Cited

UNITED STATES PATENTS

| | | | |
|---|---|---|---|
| 1,586,691 | 6/1926 | Murray | 251—367 X |
| 2,301,176 | 11/1942 | Elliott | 251—366 X |
| 2,373,020 | 4/1945 | Doster | 137—315 |
| 2,563,012 | 8/1951 | Dopp et al. | 251—367 |
| 2,626,775 | 1/1953 | Lange et al. | 137—315 X |
| 2,664,098 | 12/1953 | McInerney | 29—157.1 X |
| 2,665,875 | 1/1954 | MacGregor | 251—367 |

WILLIAM F. O'DEA, *Primary Examiner.*

D. MATTHEWS, *Assistant Examiner.*

U.S. Cl. X.R.

29—157.1; 251—214, 367; 137—315